(No Model.)

L. R. CHURCHILL.
BICYCLE.

No. 248,709. Patented Oct. 25, 1881.

WITNESSES
F. F. McClintock.
A. O. Orne.

INVENTOR
Lucius R. Churchill
Per Frank G. Parker

UNITED STATES PATENT OFFICE.

LUCIUS R. CHURCHILL, OF EAST BRIDGEWATER, MASSACHUSETTS.

BICYCLE.

SPECIFICATION forming part of Letters Patent No. 248,709, dated October 25, 1881.

Application filed August 10, 1881. (No model.)

*To all whom it may concern:*

Be it known that I, LUCIUS R. CHURCHILL, a citizen of the United States, residing at East Bridgewater, in the county of Plymouth and State of Massachusetts, have invented a new and useful Improvement in Bicycles, of which the following is a specification.

My invention relates to a device to be interposed between the pedal and the crank-pin, the object being to enable the user to operate a larger machine than could be operated by the ordinary pedal arrangement. I attain this object by mechanism illustrated in the accompanying drawings, in which—

Figure 1:
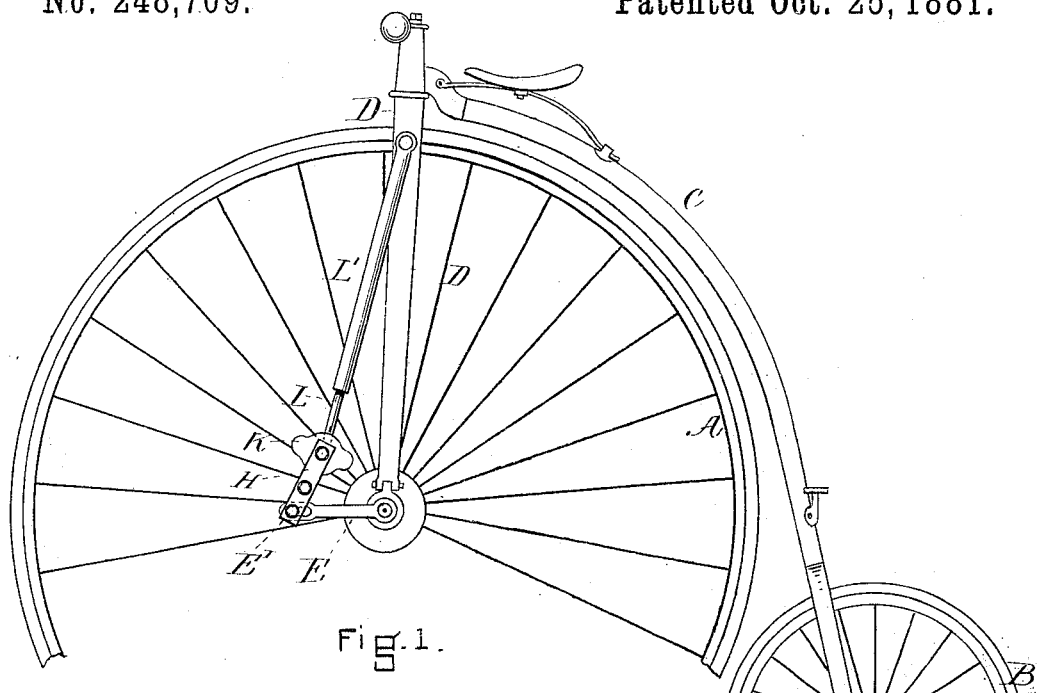
Figure 2:
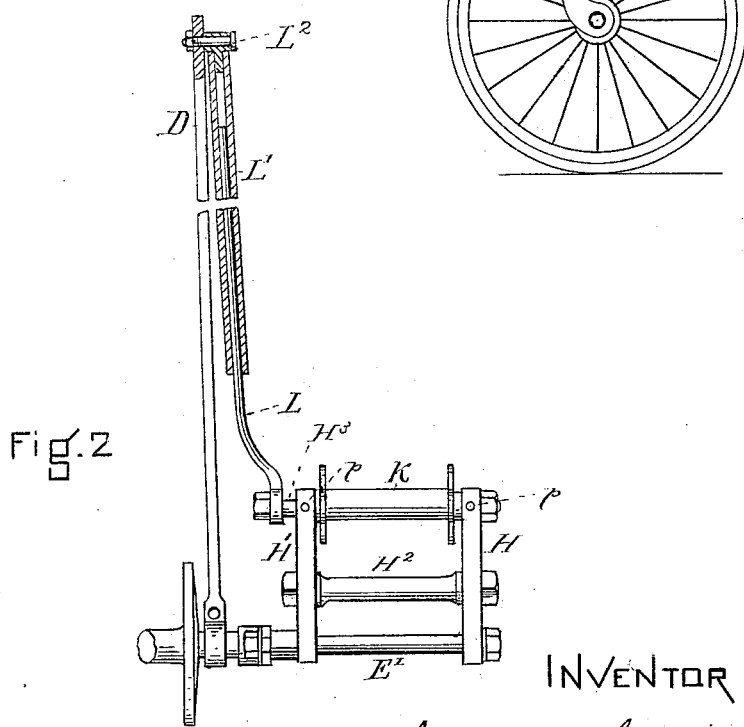

Figure 1 is an elevation of a bicycle with my improvement attached. Fig. 2 shows in detail the parts which embody and immediately connect with my improved device.

In the drawings, A and B represent respectively the large and small wheel; D, the fork; C, the back-bone, and E the crank. All these, being made and connected in any of the well-known styles, require no description.

To the crank-pin E', I attach the metal bars H H', the same being firmly united by means of a cross-bar, $H^2$, aided by the cross-bar $H^3$, which is attached to the side pieces, H H', by the pins $p$ $p$, so that the parts H $H^2$ H' $H^3$ form together a firm rectangular frame, the lower end of which forms housings for the crank-pin E, while the upper end furnishes a firm support for the swiveling pedal K. The crank-pin E' fits in this frame as a journal, being free to revolve in it.

To hold the frame H H' $H^2$ $H^3$ in a position always approximating to a vertical one above the crank-pin E', I use the following device: To the fixed bar $H^3$, I rigidly attach a piston-rod, L, said piston-rod L moving in the tube L', said tube L' being pivoted at its upper end by the pin $L^2$ to the yoke D.

I do not wish to confine myself to the particular device above described for holding the frame H H' $H^2$, &c., in position, as that may be done in a variety of ways. For instance, the link or piston L might have attached to its upper end a pivot which may slide in a slot made in the yoke D, or the pivot may be attached to a box to slide on the yoke D.

From the fact that by my device the foot-pedal K is always maintained at a distance of several inches, according to its construction, above the crank-pin, it enables the rider to use a larger wheel than he could otherwise use.

I claim as my invention the following:

The combination of the crank-pin E E', the frame H H' $H^2$ $H^3$, and pedal K with the guiding device L L' $L^2$ and the fork D, all arranged and operating together substantially as described, and for the purpose set forth.

LUCIUS R. CHURCHILL.

Witnesses:
L. F. ALDEN,
W. P. WHITMAN.